US010662822B2

(12) United States Patent
Iwama et al.

(10) Patent No.: US 10,662,822 B2
(45) Date of Patent: May 26, 2020

(54) HEAT CYCLE SYSTEM

(71) Applicant: Honda Motor Co., Ltd., Tokyo (JP)

(72) Inventors: Keizo Iwama, Saitama (JP); Makoto Otani, Saitama (JP); Shinichi Tosa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/175,848

(22) Filed: Oct. 31, 2018

(65) Prior Publication Data
US 2019/0128146 A1    May 2, 2019

(30) Foreign Application Priority Data

Nov. 1, 2017    (JP) .................................. 2017-211692

(51) Int. Cl.
*F01K 23/06* (2006.01)
*F01D 15/10* (2006.01)
(Continued)

(52) U.S. Cl.
CPC ............ *F01K 23/065* (2013.01); *F01D 15/10* (2013.01); *F01D 17/105* (2013.01);
(Continued)

(58) Field of Classification Search
CPC ...... F01K 23/065; F01K 23/101; F01K 11/00; F01K 11/02; F01K 25/10; F01K 13/02;
(Continued)

(56) References Cited

U.S. PATENT DOCUMENTS 5,291,941 A * 3/1994 Enomoto ........... B60H 1/00007
                                                                165/62
7,174,732 B2 * 2/2007 Taniguchi ............ B01D 5/0093
                                                                60/514
(Continued)

FOREIGN PATENT DOCUMENTS

JP    H06147689    5/1994
JP    H09277821    10/1997
(Continued)

OTHER PUBLICATIONS

"Office Action of Japan Counterpart Application," with English translation thereof, dated Oct. 1, 2019, p. 1-p. 10.
(Continued)

*Primary Examiner* — Hoang M Nguyen
(74) *Attorney, Agent, or Firm* — JCIPRNET

(57) ABSTRACT

A heat cycle system includes a cooling circuit and a Rankine cycle circuit in which an organic medium circulates. The Rankine cycle circuit includes an evaporator, an expander, and a condenser. Before warm-up of an engine, a control device executes a warm-up mode in which the organic medium is circulated through the condenser, the expander and the evaporator in sequence; after the warm-up of the engine, the control device executes a waste heat recovery mode in which the organic medium is circulated through the evaporator, the expander and the condenser in sequence. In the warm-up mode, by supplying energy to the expander, the control device compresses the organic medium passing through the condenser and supplies the compressed organic medium to the evaporator; in the waste heat recovery mode, by depressurizing the organic medium passing through the evaporator by the expander, the control device recovers the energy generated by the expander.

6 Claims, 6 Drawing Sheets

(51) Int. Cl.
*F01D 17/10* (2006.01)
*F01D 17/14* (2006.01)
*F01D 25/10* (2006.01)
*F01K 13/02* (2006.01)
*F01K 25/10* (2006.01)
*F01N 5/02* (2006.01)
*F01K 11/02* (2006.01)
*F01K 11/00* (2006.01)
*F01K 23/10* (2006.01)
*F25B 29/00* (2006.01)
*F25B 27/02* (2006.01)
*F02G 5/04* (2006.01)

(52) U.S. Cl.
CPC ........... *F01D 17/145* (2013.01); *F01D 25/10* (2013.01); *F01K 11/00* (2013.01); *F01K 11/02* (2013.01); *F01K 13/02* (2013.01); *F01K 23/101* (2013.01); *F01K 25/10* (2013.01); *F01N 5/02* (2013.01); *F25B 27/02* (2013.01); *F25B 29/00* (2013.01); *F02G 5/04* (2013.01); *F05D 2260/606* (2013.01)

(58) Field of Classification Search
CPC .......... F01N 5/02; F01D 25/10; F01D 17/145; F01D 17/105; F01D 15/10; F02G 5/04; F05D 2260/606; F25B 27/02; F25B 29/00
USPC ................... 60/614, 616, 618; 62/238.6, 239
See application file for complete search history.

(56) References Cited

U.S. PATENT DOCUMENTS

| | | | |
|---|---|---|---|
| 8,517,087 B2* | 8/2013 | Zeigler | B60H 1/00907 165/202 |
| 8,627,663 B2* | 1/2014 | Ernst | F01K 9/003 60/616 |
| 9,573,437 B2* | 2/2017 | Osaka | B60H 1/0005 |
| 2004/0216483 A1* | 11/2004 | Inaba | F02G 5/04 62/498 |
| 2006/0005557 A1* | 1/2006 | Takano | B60H 1/00878 62/238.6 |
| 2011/0041505 A1 | 2/2011 | Kasuya et al. | |

FOREIGN PATENT DOCUMENTS

| | | |
|---|---|---|
| JP | 2004036942 | 2/2004 |
| JP | 2006188156 | 7/2006 |
| JP | 2009202794 | 9/2009 |
| JP | 2011173543 | 9/2011 |
| JP | 2016119196 | 6/2016 |
| WO | 2011122294 | 7/2013 |

OTHER PUBLICATIONS

"Office Action of Japan Counterpart Application", dated May 28, 2019, with English translation thereof, p. 1-p. 10.

* cited by examiner

HEAT CYCLE SYSTEM

CROSS-REFERENCE TO RELATED APPLICATION

This application claims the priority benefit of Japan Application No. 2017-211692, filed on Nov. 1, 2017. The entirety of the above-mentioned patent application is hereby incorporated by reference herein and made a part of this specification.

BACKGROUND

Technical Field

The disclosure relates to a heat cycle system, more particularly to a heat cycle system including a cooling circuit of an internal combustion engine, and a Rankine cycle circuit.

Related Art

In recent years, the development of a waste heat regeneration system that extracts mechanical energy or electric energy from waste heat of an internal combustion engine of a vehicle by using the Rankine cycle is underway. In such a waste heat regeneration system, the Rankine cycle for extracting energy from the waste heat is realized by a Rankine cycle circuit including a pump pumping a working medium, a heat exchanger heating the working medium with the waste heat of the internal combustion engine, an expander generating mechanical energy or electric energy by expanding the working medium heated by the heat exchanger, and a condenser condensing the working medium expanded by the expander (e.g., see WO 2011/122294 (hereinafter Patent Document 1)).

In addition, in order to suppress deterioration of fuel efficiency before the internal combustion engine is sufficiently warmed up, such as immediately after startup of the internal combustion engine, in the disclosure of Patent Document 1, part of the Rankine cycle circuit is used to warm up the internal combustion engine. More specifically, in the disclosure of Patent Document 1, by causing the expander to function as a compressor by using electric energy while causing the working medium to bypass from the pump and the condenser by using a bypass flow path, the working medium is circulated through the compressor→an exhaust boiler→a cooling water boiler→the bypass flow path→the compressor in this order. In this process, the working medium absorbs heat from exhaust of the internal combustion engine and becomes a high temperature gas in the exhaust boiler, then gives heat to cooling water of the internal combustion engine in the cooling water boiler, and warms up the internal combustion engine. That is, in the disclosure of Patent Document 1, at the time of warm-up of the internal combustion engine, thermal energy of the exhaust of the internal combustion engine is transferred to the cooling water of the internal combustion engine via the working medium.

By the way, in the Rankine cycle circuit recovering the waste heat as described above, to increase recovery efficiency of the waste heat, an organic medium having a lower boiling point than the cooling water is often used as the working medium. However, the organic medium has lower specific heat than the cooling water. Therefore, at the time of warm-up of the internal combustion engine, in the disclosure of Patent Document 1 in which the thermal energy is transferred from the exhaust to the cooling water via the low specific heat working medium, the cooling water cannot be efficiently heated, and the internal combustion engine cannot be sufficiently warmed up.

The disclosure provides a heat cycle system capable of efficiently performing both waste heat recovery and warm-up of the internal combustion engine.

SUMMARY (1) A heat cycle system (e.g., later-described heat cycle systems 1, 1A, and 1B) according to the disclosure includes: a cooling circuit (e.g., later-described cooling circuits 3, 3A, and 3B) in which cooling water performing heat exchange with an internal combustion engine (e.g., later-described engine 2) and exhaust of the internal combustion engine circulates; a Rankine cycle circuit (e.g., later-described Rankine cycle circuits 5, 5A, and 5B), including a first heat exchanger (e.g., later-described evaporator 52) performing heat exchange between an organic medium having a lower boiling point than the cooling water and the cooling water of the cooling circuit, an expander (e.g., later-described expander 53) depressurizing the organic medium passing through the first heat exchanger and generating energy, and a second heat exchanger (e.g., later-described condenser 54) performing heat exchange between the organic medium and outside air; and a control device (e.g., later-described control devices 7 and 7B) operating the Rankine cycle circuit in a warm-up mode in which the organic medium is circulated through the second heat exchanger, the expander, and the first heat exchanger in this order before warm-up of the internal combustion engine, and operating the Rankine cycle circuit in a waste heat recovery mode in which the organic medium is circulated through the first heat exchanger, the expander, and the second heat exchanger in this order after the warm-up of the internal combustion engine, wherein, in the warm-up mode, by supplying the energy to the expander, the control device compresses the organic medium passing through the second heat exchanger and supplies the compressed organic medium to the first heat exchanger, and in the waste heat recovery mode, by depressurizing the organic medium passing through the first heat exchanger by the expander, the control device recovers the energy generated by the expander.

(2) In this case, in one or more embodiments, the Rankine cycle circuit further includes a first flow path (e.g., later-described first flow path 58a) connecting the first heat exchanger and the second heat exchanger, a pump (e.g., later-described pump 51) provided on the first flow path, a second flow path (e.g., later-described second flow path 58b) bypassing the pump and connecting the first heat exchanger and the second heat exchanger, and an expansion valve (e.g., later-described electronic expansion valve 59) provided on the second flow path. In the warm-up mode, the control device opens the expansion valve, depressurizes the organic medium passing through the first heat exchanger, and supplies the depressurized organic medium to the second heat exchanger.

(3) In this case, in one or more embodiments, the heat cycle system further includes an outside air temperature acquisition unit (e.g., later-described outside air temperature sensor 73) acquiring a temperature of the outside air. During execution of the warm-up mode, the control device controls an opening degree of the expansion valve based on the outside air temperature acquired by the outside air temperature acquisition unit.

(4) In this case, in one or more embodiments, the heat cycle system further includes a power storage device (e.g., later-described batteries 8, 8A, and 8B) exchanging electric energy with the expander. In the case where a storage amount of the power storage device is greater than a predetermined value, the control device executes the warm-up mode, and in the case where the storage amount of the power storage device is smaller than the predetermined value, the control device does not execute the warm-up mode.

(5) In this case, in one or more embodiments, the heat cycle system further includes a power storage device (e.g., later-described batteries 8, 8A, and 8B) capable of exchanging heat with the organic medium circulating through the Rankine cycle circuit. The Rankine cycle circuit includes a bypass flow path (e.g., later-described evaporator bypass flow path 61) bypassing the first heat exchanger, and a flow path switching valve (e.g., later-described first three-way valve 62) switching a circulation flow path of the organic medium between a flow path via the first heat exchanger and a flow path via the bypass flow path. Before the warm-up of the internal combustion engine and the power storage device, the control device sets the flow path switching valve to the side of the bypass flow path, and after the organic medium is circulated through the second heat exchanger, the expander, and the bypass flow path in this order and the power storage device is warmed up, the control device sets the flow path switching valve to the side of the first heat exchanger and performs the warm-up mode.

(1) The heat cycle system of the disclosure includes the cooling circuit in which the cooling water performing heat exchange with the internal combustion engine and the exhaust of the internal combustion engine circulates, and the Rankine cycle circuit including the first heat exchanger, the expander and the second heat exchanger through which the organic medium having a lower boiling point than the cooling water circulates. After the warm-up of the internal combustion engine, the control device operates the Rankine cycle circuit in the waste heat recovery mode in which the organic medium is circulated through the first heat exchanger, the expander, and the second heat exchanger in this order. In the waste heat recovery mode, the organic medium is heated by the cooling water heated by the warmed-up internal combustion engine and the exhaust of the internal combustion engine in the first heat exchanger, energy is recovered in the process of depressurizing the organic medium in the expander, and the organic medium is then cooled by heat exchange with the outside air in the second heat exchanger. Accordingly, after the warm-up of the internal combustion engine, waste heat of the internal combustion engine can be recovered as energy. Here, in the disclosure, during the waste heat recovery, thermal energy of the exhaust of the internal combustion engine is transferred to the organic medium in the first heat exchanger via the cooling water circulating through the cooling circuit. That is, unlike the disclosure of Patent Document 1, the organic medium does not directly exchange heat with the exhaust of the internal combustion engine. For this reason, in the disclosure, since heat resistance required for the Rankine cycle circuit can be equal to or lower than the temperature of the cooling water, which is lower than the temperature of the exhaust, a light material can be used accordingly. In addition, since thermal decomposition of the organic medium due to heat of the exhaust can be suppressed, controllability can also be improved.

In addition, before the warm-up of the internal combustion engine, the control device operates the Rankine cycle circuit in the warm-up mode in which the organic medium is circulated through the second heat exchanger, the expander, and the first heat exchanger in this order. In the warm-up mode, the organic medium is compressed in the expander, cooled by heat exchange with the cooling water circulating through the cooling circuit in the first heat exchanger, and then heated by heat exchange with the outside air in the second heat exchanger. On the other hand, in the cooling circuit, the cooling water is heated by performing heat exchange with the exhaust. Therefore, in the warm-up mode in the heat cycle system of the disclosure, the internal combustion engine can be warmed up using the thermal energy obtained from the exhaust of the internal combustion engine, the thermal energy obtained by compressing the organic medium by the expander, and the thermal energy obtained by heating the organic medium with the outside air in the second heat exchanger. Particularly, compared to the disclosure of Patent Document 1, in the disclosure, since the cooling water can be heated with the thermal energy obtained by heating the organic medium with the outside air in the second heat exchanger, the internal combustion engine can be promptly warmed up accordingly. In addition, unlike the disclosure of Patent Document 1, in the disclosure, since the thermal energy of the exhaust is transferred to the cooling water without via the organic medium having lower specific heat than the cooling water, the internal combustion engine can be promptly warmed up using the thermal energy of the exhaust.

(2) In the disclosure, two flow paths, namely, the first flow path provided with the pump, and the second flow path provided with the expansion valve and bypassing the pump, are provided in the Rankine cycle circuit. In the warm-up mode, the expansion valve is opened, and the organic medium passing through the first heat exchanger is depressurized and supplied to the second heat exchanger. Accordingly, in the warm-up mode, the organic medium circulates through the expander→the first heat exchanger→the expansion valve→the second heat exchanger→the expander in this order. Particularly, in the disclosure, by providing the expansion valve on the circulation flow path of the organic medium in the warm-up mode, the organic medium flowing into the second heat exchanger can be depressurized so that the organic medium can be heated by heat exchange with the outside air in the second heat exchanger, and the cooling water can be heated using the thermal energy of the outside air, and thus the internal combustion engine can be promptly warmed up.

(3) In the heat cycle system of the disclosure, during execution of the warm-up mode, the opening degree of the expansion valve is controlled based on the outside air temperature acquired by the outside air temperature acquisition unit. Accordingly, in the warm-up mode, the organic medium can be depressurized so that the organic medium can be heated with the outside air in the second heat exchanger, and the thermal energy for warming up the internal combustion engine can be obtained.

(4) In the heat cycle system of the disclosure, the power storage device exchanging electric energy with the expander is provided. In the case where the storage amount of the power storage device is greater than the predetermined value, the warm-up mode is executed by using the electric energy of the power storage device; in the case where the storage amount is smaller than the predetermined value, the warm-up mode is not executed. Accordingly, the internal combustion engine can be warmed up in an Appropriate manner corresponding to the storage amount of the power storage device. Moreover, in the disclosure, in addition to the Rankine cycle circuit in which the organic medium circulates, the cooling circuit in which the cooling water circulates is provided. In addition, as described above, in the cooling circuit, since the thermal energy of the exhaust is recovered by the cooling water having higher specific heat than the organic medium, even if the warm-up mode is not executed, the warm-up of the internal combustion engine will not be excessively prolonged.

(5) In order to efficiently warm up the internal combustion engine in the warm-up mode, it is necessary to supply electric energy from the power storage device to the expander. In addition, in a so-called hybrid vehicle equipped with a drive motor in addition to the internal combustion engine as a power generation source, since a load ratio of the drive motor tends to increase before warm-up of the internal combustion engine, it is necessary to supply electric energy from the power storage device to the drive motor. In contrast, when the temperature of the power storage device is low, sufficient electric energy cannot be supplied from the power storage device to the expander or the drive motor. Accordingly, in one or more embodiments, in the case where both the internal combustion engine and the power storage device are in the state before warm-up, the warm-up of the power storage device is prioritized over the warm-up of the internal combustion engine. In contrast, in the heat cycle system of the disclosure, the power storage device capable of exchanging heat with the organic medium circulating through the Rankine cycle circuit is provided. Furthermore, in the Rankine cycle circuit, the bypass flow path bypassing the first heat exchanger, and the flow path switching valve switching the circulation flow path of the organic medium between the flow path via the first heat exchanger and the flow path via the bypass flow path, are provided. If before the warm-up of the internal combustion engine, since the organic medium may be cooled by the cooling water when flowing through the first heat exchanger, it may accordingly take time to warm up the power storage device. Therefore, in the disclosure, if both the internal combustion engine and the power storage device are in the state before warm-up, the flow path switching valve is set to the side of the bypass flow path, and the organic medium is circulated through the second heat exchanger→the expander→the bypass flow path in this order, so that the organic medium does not pass through the first heat exchanger. Accordingly, the power storage device can be promptly warmed up. Moreover, as described above, in the disclosure, since the cooling circuit is provided in addition to the Rankine cycle circuit, the warm-up of the internal combustion engine will not be excessively prolonged even without executing the warm-up mode. In addition, in the disclosure, after the power storage device is warmed up, the flow path switching valve is set to the side of the first heat exchanger and the warm-up mode is performed. Accordingly, the internal combustion engine can be promptly warmed up. According to the above, in the disclosure, the power storage device and the internal combustion engine can be warmed up in an appropriate order.

DESCRIPTION OF THE EMBODIMENTS

First Embodiment

A first embodiment of the disclosure is hereinafter explained with reference to the drawings.

Figure 1:
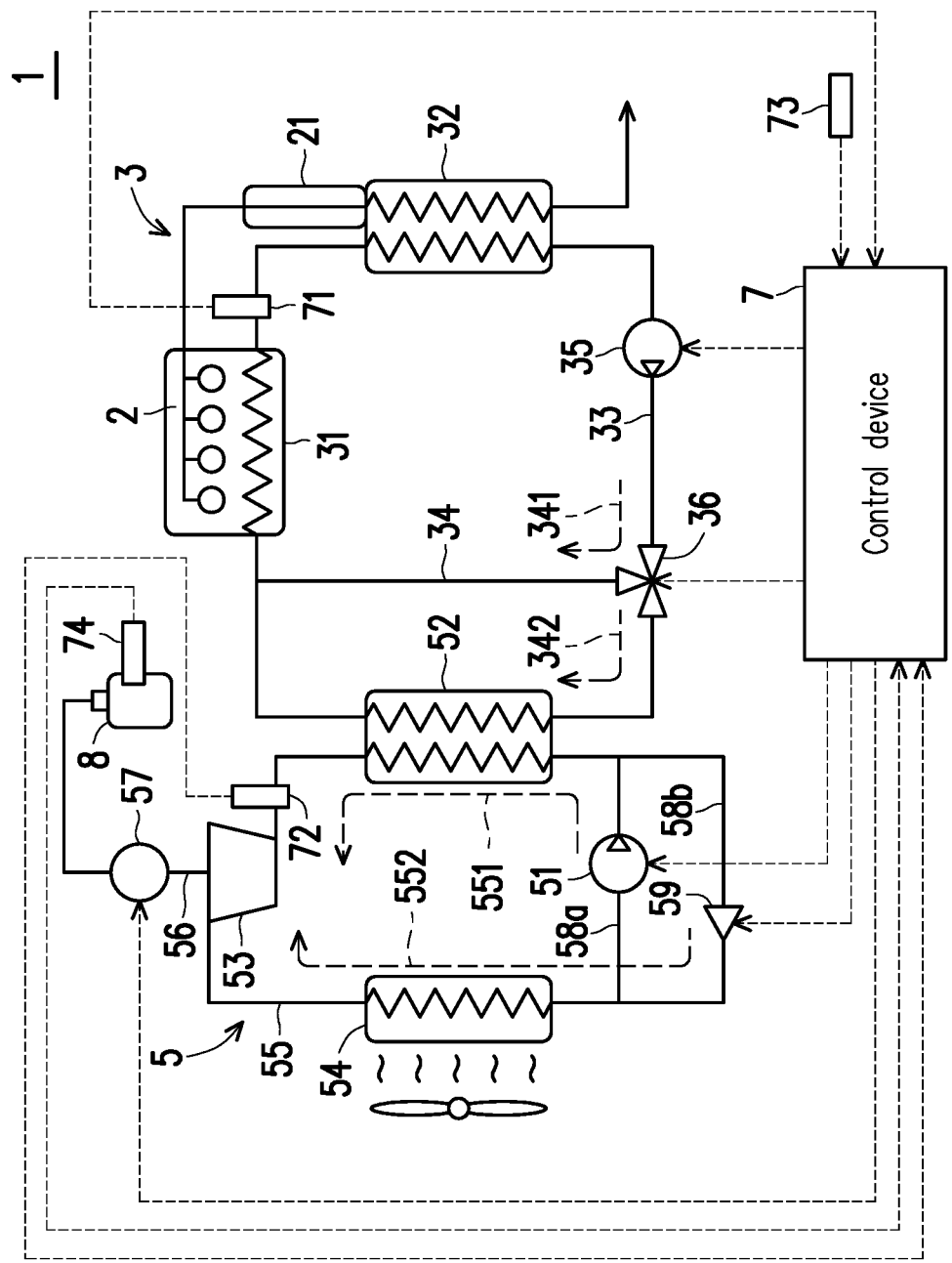
FIG. 1 illustrates a configuration of a heat cycle system according to a first embodiment of the disclosure.

FIG. 1 illustrates a configuration of a heat cycle system 1 according to the present embodiment. The heat cycle system 1 is installed on a vehicle equipped with an internal combustion engine (hereinafter referred to as "engine") 2, warming up the engine 2 at startup, and recovering waste heat generated by the warmed-up engine 2 and converting the waste heat into electric energy.

The heat cycle system 1 includes a cooling circuit 3 which includes the engine 2 as part of its path and in which cooling water circulates, a Rankine cycle circuit 5 realizing the Rankine cycle, a control device 7 controlling the cooling circuit 3 and the Rankine cycle circuit 5, and a battery 8 capable of being discharged and charged.

The cooling circuit 3 is composed of a cooling water circulation flow path 33 through which the cooling water performing heat exchange with the engine 2 and exhaust of the engine 2 circulates and a plurality of devices provided on the cooling water circulation flow path 33. More specifically, the cooling circuit 3 includes: the cooling water circulation flow path 33 including, on the flow path, a later-described evaporator 52 provided in the Rankine cycle circuit 5; a first cooling water flow path 31 being part of the cooling water circulation flow path 33; a second cooling water flow path 32 being part of the cooling water circulation flow path 33, a bypass flow path 34 bypassing the evaporator 52; a water pump 35 pumping the cooling water; and a three-way valve 36 provided at a junction between the cooling water circulation flow path 33 and the bypass flow path 34.

The first cooling water flow path 31 is a cooling water flow path formed in a cylinder block of the engine 2 and promoting heat exchange between the cooling water and the engine 2. The second cooling water flow path 32 is a cooling water flow path promoting heat exchange between the cooling water and the exhaust. The second cooling water flow path 32 is formed downstream of an exhaust purification catalyst 21 in an exhaust pipe. In the annular cooling water circulation flow path 33, the evaporator 52 is provided in a position that is downstream of the second cooling water flow path 32 and is upstream of the first cooling water flow path 31 in the case where the cooling water is circulated by the water pump 35.

The water pump 35 is provided on the cooling water circulation flow path 33. The water pump 35 operates in accordance with a control signal from the control device 7 and circulates the cooling water in the cooling water circulation flow path 33 through the first cooling water flow path 31→the second cooling water flow path 32→the evaporator 52→the first cooling water flow path 31 in this order. The water pump 35 is provided, for example, between the second cooling water flow path 32 and the evaporator 52 in the cooling water circulation flow path 33. Moreover, the position in which the water pump 35 is provided is not limited to the above. The water pump 35 may be located between the evaporator 52 and the first cooling water flow path 31, or between the first cooling water flow path 31 and the second cooling water flow path 32, in the cooling water circulation flow path 33.

In the cooling water circulation flow path 33, the bypass flow path 34 communicates between the evaporator 52 and the first cooling water flow path 31 and between the second cooling water flow path 32 and the evaporator 52, and bypasses the evaporator 52. The three-way valve 36 operates in accordance with the control signal from the control device 7 and switches a circulation flow path of the cooling water between a first warm-up flow path 341 including the bypass flow path 34 and excluding the evaporator 52 and a second warm-up flow path 342 including the evaporator 52 and excluding the bypass flow path 34. The circulation flow path of the cooling water is operated in accordance with the control signal from the control device 7 and switched between a flow path via the evaporator 52 and a flow path via the bypass flow path 34. The position in which the three-way valve 36 is provided may be a junction between the side of the second cooling water flow path 32 in the cooling water circulation flow path 33 and the bypass flow path 34 as illustrated in FIG. 1, or may be a junction between the side of the first cooling water flow path 31 in the cooling water circulation flow path 33 and the bypass flow path 34.

Although omitted from illustration, a radiator cooling the cooling water by performing heat exchange between the cooling water and the outside air and a thermostat adjusting amount of the cooling water flowing into the radiator are provided in the cooling circuit 3. The thermostat is fully closed in the case where the temperature of the cooling water is equal to or lower than a predetermined valve closing temperature, and the flow of the cooling water into the radiator is cut off. The thermostat starts to open when the temperature of the cooling water reaches or is higher than the above valve closing temperature, and the cooling water in an amount corresponding to an opening degree of the thermostat flows into the radiator. In addition, the thermostat is fully opened in the case where the temperature of the cooling water is equal to or higher than a valve opening temperature higher than the above valve closing temperature. The radiator is connected to the cooling circuit 3 so as to be, for example, in parallel with the evaporator 52. Moreover, since the Rankine cycle circuit 5 also has a function of cooling the cooling water in a later-described waste heat recovery mode, the radiator and the thermostat may not be provided.

The Rankine cycle circuit 5 is composed of an organic medium circulation flow path 55 in which an organic medium having a lower boiling point and lower specific heat than the cooling water circulates and a plurality of devices provided on the organic medium circulation flow path 55. More specifically, the Rankine cycle circuit 5 includes: the annular organic medium circulation flow path 55 in which the organic medium circulates; a pump 51 provided on a first flow path 58a being part of the organic medium circulation flow path 55, the evaporator 52 performing heat exchange between the cooling water of the cooling circuit 3 and the organic medium; an expander 53 depressurizing the organic medium passing through the evaporator 52; and a condenser 54 performing heat exchange between the outside air and the organic medium. In the annular organic medium circulation flow path 55, the pump 51, the condenser 54, the expander 53 and the evaporator 52 are provided in this order. In the Rankine cycle circuit 5, the Rankine cycle is realized by circulating the organic medium in the organic medium circulation flow path 55.

The pump 51 is provided on the first flow path 58a connecting the evaporator 52 and the condenser 54 in the organic medium circulation flow path 55. The pump 51 operates in accordance with the control signal from the control device 7, pressurizes the organic medium supplied from the condenser 54 via the organic medium circulation flow path 55, and supplies the pressurized organic medium to the evaporator 52 via the organic medium circulation flow path 55. Moreover, a rotational speed of the pump 51 is adjusted by the control device 7 so that a liquid amount of the organic medium in the evaporator 52 is maintained at an appropriate amount.

The evaporator 52 includes an organic medium flow path through which the organic medium flows and a cooling water flow path through which the cooling water of the cooling circuit 3 flows, and performs heat exchange between the organic medium and the cooling water. The condenser 54 includes an organic medium flow path through which the organic medium flows and a fan supplying the outside air to the organic medium flow path, and performs heat exchange between the organic medium and the outside air.

The expander 53 is connected to a motor generator 57 via a drive shaft 56. In addition, electric energy can be exchanged between the motor generator 57 and the battery 8. When rotating forward, the expander 53 depressurizes the organic medium passing through the evaporator 52 and supplies the depressurized organic medium to the condenser 54, causing the motor generator 57 to generate electricity with mechanical energy recovered in the process of depressurizing the organic medium, and the battery 8 is charged with the generated electricity. In addition, when rotating reversely, the expander 53 operates as a compressor by supplying electric energy from the battery 8 to the motor generator 57. The expander 53 operating as a compressor pressurizes the organic medium passing through the condenser 54 and supplies the pressurized organic medium to the evaporator 52.

In addition, in the Rankine cycle circuit 5, a second flow path 58b connecting an upstream side and a downstream side of the pump 51 in the organic medium circulation flow path 55 and bypassing the pump 51, and an electronic expansion valve 59 provided on the second flow path 58b are further provided.

The electronic expansion valve 59 is a throttle valve, depressurizing the organic medium supplied from the evaporator 52 via the second flow path 58b and supplying the depressurized organic medium to the condenser 54 via the second flow path 58b. An opening degree of the electronic expansion valve 59 is adjusted in accordance with the control signal from the control device 7.

Here, when the electronic expansion valve 59 is fully closed, the pump 51 is turned on, and the expander 53 is further rotated forward, in the Rankine cycle circuit 5, a forward rotation flow path 551 is formed in which the organic medium passes through the pump 51, the evaporator 52, the expander 53, and the condenser 54, and returns again to the pump 51.

In addition, when the electronic expansion valve 59 is opened, the pump 51 is turned off, and the expander 53 is further rotated reversely to operate as a compressor, in the Rankine cycle circuit 5, a reverse rotation flow path 552 is formed in which the organic medium passes through the electronic expansion valve 59, the condenser 54, the expander 53, and the evaporator 52, and returns again to the electronic expansion valve 59.

As described above, in the cooling circuit 3 and the Rankine cycle circuit 5, a plurality of flow paths, namely, the first warm-up flow path 341, the second warm-up flow path 342, the forward rotation flow path 551 and the reverse rotation flow path 552, are formed. Therefore, in the heat cycle system 1, by combining these flow paths 341, 342, 551 and 552, it is possible to realize various operation modes. More specifically, in the heat cycle system 1, three operation modes, namely, a normal startup mode, a warm-up mode, and a waste heat recovery mode, can be selectively executed.

The normal startup mode is an operation mode in which warm-up of the engine 2 is promoted while heat exchange between the Rankine cycle circuit 5 and the cooling circuit 3 is prevented. The normal startup mode is realized by setting the circulation flow path of the cooling water to the first warm-up flow path 341 by the three-way valve 36 of the cooling circuit 3 and turning on the water pump 35. In the normal startup mode, the cooling water passes through the water pump 35, the three-way valve 36, the first cooling water flow path 31, and the second cooling water flow path 32, and returns again to the water pump 35. In the normal startup mode, the cooling water of the engine 2 is heated by the exhaust in the second cooling water flow path 32, and warms up the engine 2 with this heat.

The waste heat recovery mode is an operation mode in which the waste heat of the engine 2 is recovered while heat exchange between the Rankine cycle circuit 5 and the cooling circuit 3 is performed. In the waste heat recovery mode, on the side of the cooling circuit 3, the circulation flow path of the cooling water is set to the second warm-up flow path 342 by the three-way valve 36, and the water pump 35 is turned on. Accordingly, in the waste heat recovery mode, the cooling water passes through the water pump 35, the three-way valve 36, the evaporator 52, the first cooling water flow path 31, and the second cooling water flow path 32, and returns again to the water pump 35.

Figure 2A:
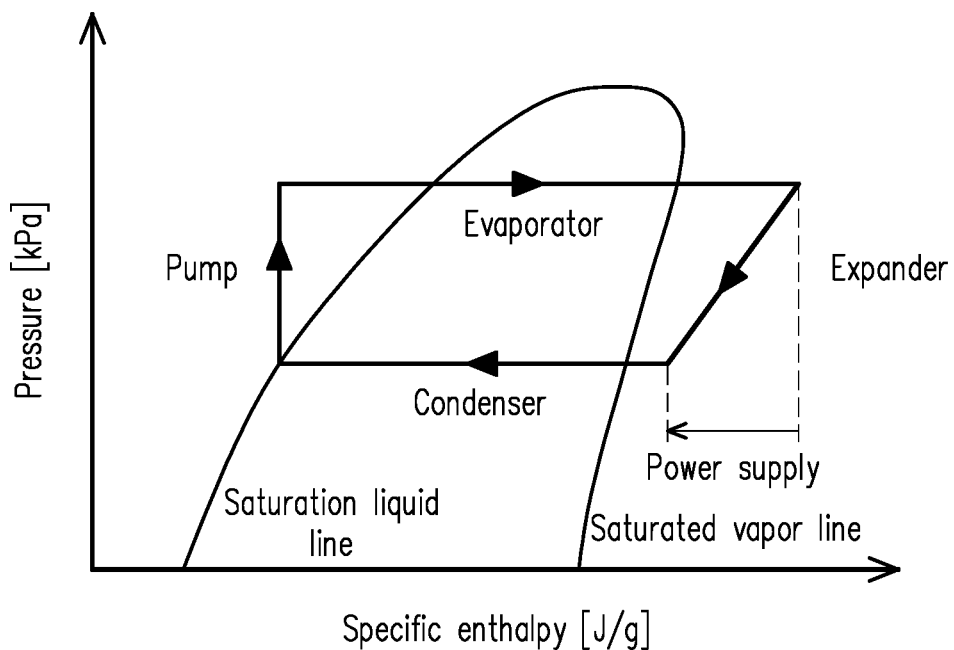
FIG. 2A is a pressure-enthalpy diagram (p-h diagram) of a heat cycle realized in a Rankine cycle circuit during execution of a waste heat recovery mode.

On the other hand, in the waste heat recovery mode, on the side of the Rankine cycle circuit 5, by fully closing the electronic expansion valve 59, turning on the pump 51, and further rotating the expander 53 forward, the flow path of the organic medium is set to the forward rotation flow path 551. In the waste heat recovery mode, the organic medium passes through the pump 51, the evaporator 52, the expander 53, and the condenser 54, and returns again to the pump 51. During execution of the waste heat recovery mode, the heat cycle as shown in FIG. 2A is realized in the Rankine cycle circuit 5. More specifically, during execution of the waste heat recovery mode, the organic medium is compressed by the pump 51 and supplied to the evaporator 52. In the evaporator 52, the organic medium is heated by heat exchange with the cooling water heated by the waste heat of the engine 2, and is supplied to the expander 53. In the expander 53, the organic medium is depressurized and supplied to the condenser 54. In addition, in the condenser 54, the organic medium is cooled by heat exchange with the outside air and returns again to the pump 51. In the waste heat recovery mode, in such a heat cycle, with the mechanical energy recovered in the process of depressurizing the organic medium by the expander 53, the motor generator 57 generates electricity, and the battery 8 is charged with the generated electricity.

The warm-up mode is an operation mode in which warm-up of the engine 2 is promoted further than in the above normal startup mode while heat exchange between the Rankine cycle circuit 5 and the cooling circuit 3 is performed. In the warm-up mode, on the side of the cooling circuit 3, the circulation flow path of the cooling water is set to the second warm-up flow path 342 by the three-way valve 36, and the water pump 35 is turned on. Accordingly, in the warm-up mode, the cooling water passes through the water pump 35, the three-way valve 36, the evaporator 52, the first cooling water flow path 31, and the second cooling water flow path 32, and returns again to the water pump 35, similarly to the waste heat recovery mode.

Figure 2B:
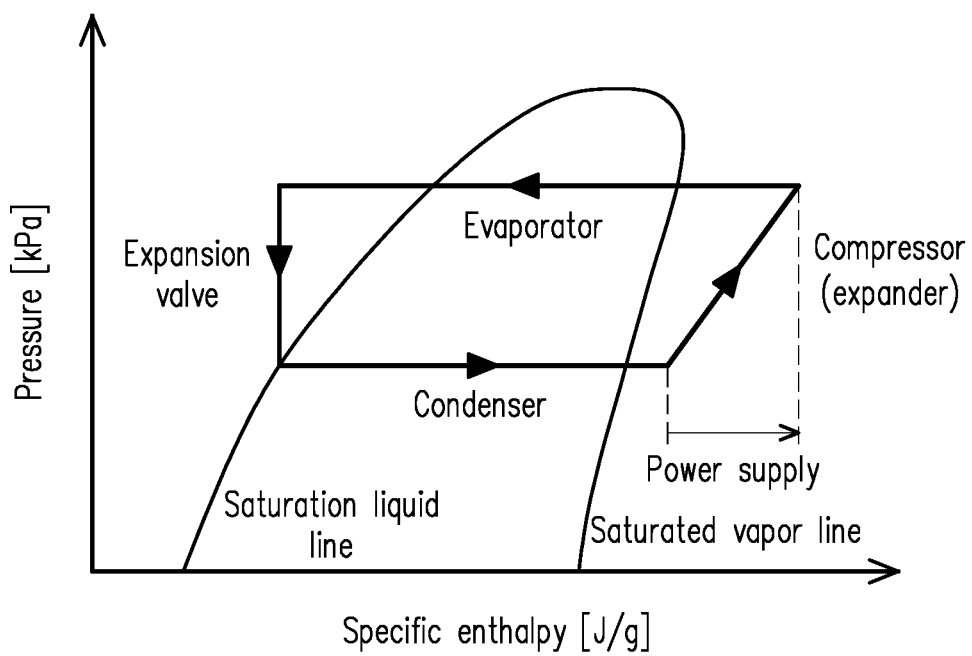
FIG. 2B is a p-h diagram of a heat cycle realized in the Rankine cycle circuit during execution of a warm-up mode.

On the other hand, in the warm-up mode, on the side of the Rankine cycle circuit 5 side, by opening the electronic expansion valve 59, turning off the pump 51, and further rotating the expander 53 reversely to cause the expander 53 to operate as a compressor, the flow path of the organic medium is set to the reverse rotation flow path 552. In the warm-up mode, the organic medium passes through the electronic expansion valve 59, the condenser 54, the expander 53, and the evaporator 52, and returns again to the electronic expansion valve 59. During execution of the warm-up mode, a heat cycle as shown in FIG. 2B is realized in the Rankine cycle circuit 5. More specifically, during execution of the warm-up mode, the organic medium is depressurized by the electronic expansion valve 59 and supplied to the condenser 54. In the condenser 54, the organic medium is heated by heat exchange with the outside air and supplied to the expander 53. In the warm-up mode, the control device 7 causes the expander 53 to operate as a compressor by supplying electric energy from the battery 8 to the motor generator 57. Therefore, in the expander 53, the organic medium is compressed and supplied to the evaporator 52. In addition, in the evaporator 52, the organic medium heats the cooling water by heat exchange with the cooling water and returns again to the electronic expansion valve 59. In the warm-up mode, in such a heat cycle, by the thermal energy obtained by compressing the organic medium in the expander 53 and the thermal energy obtained by heating the organic medium depressurized by the electronic expansion valve 59 with the outside air in the condenser 54, the cooling water is heated. On the other hand, in the cooling circuit 3, the cooling water is heated by heat exchange with the exhaust. Accordingly, in the warm-up mode, by the thermal energy obtained by compressing the organic medium by the expander 53, the thermal energy obtained by heating the organic medium depressurized by the electronic expansion valve 59 with the outside air in the condenser 54, and the thermal energy obtained by heat exchange with the exhaust in the second cooling water flow path 32, the engine 2 is warmed up. Accordingly, in the warm-up mode, the engine 2 can be warmed up more promptly than in the normal startup mode.

Referring back to FIG. 1, the battery 8 is a low voltage (e.g., 12 V) lead battery supplying power to, for example, an accessory of the vehicle.

The cooling circuit 3, the Rankine cycle circuit 5, and various sensors 71 to 74 for detecting the state of the environment are connected to the control device 7.

The cooling water temperature sensor 71 sends to the control device 7 a signal corresponding to a temperature of the cooling water circulating through the cooling circuit 3, more specifically, the temperature of the cooling water flowing out from the first cooling water flow path 31. In the following, the temperature detected by the cooling water temperature sensor 71 is also referred to as cooling water outlet temperature.

The organic medium temperature sensor 72 sends to the control device 7 a signal corresponding to a temperature of the organic medium circulating through the Rankine cycle circuit 5, more specifically, the temperature of the organic medium between the expander 53 and the evaporator 52. When the expander 53 is rotated reversely as described above, the expander 53 operates as a compressor and the compressed organic medium is supplied from the expander 53 to the evaporator 52. Therefore, in the following, the temperature detected by the organic medium temperature sensor 72 is also referred to as post-compression temperature.

The outside air temperature sensor 73 sends to the control device 7 a signal corresponding to a temperature of the outside air. In the following, the temperature detected by the outside air temperature sensor 73 is simply referred to as outside air temperature.

The battery sensor 74 detects information (e.g., the temperature, voltage, current, etc. of the battery 8) required for detecting State of Charge (SOC) equivalent to a storage amount of the battery 8 and sends a signal corresponding to the detected value to the control device 7. The SOC of the battery 8 is calculated in the control device 7 based on a known algorithm using the signal from the battery sensor 74.

Next, a specific control procedure of the heat cycle system 1 is explained with reference to FIG. 3.

Figure 3:
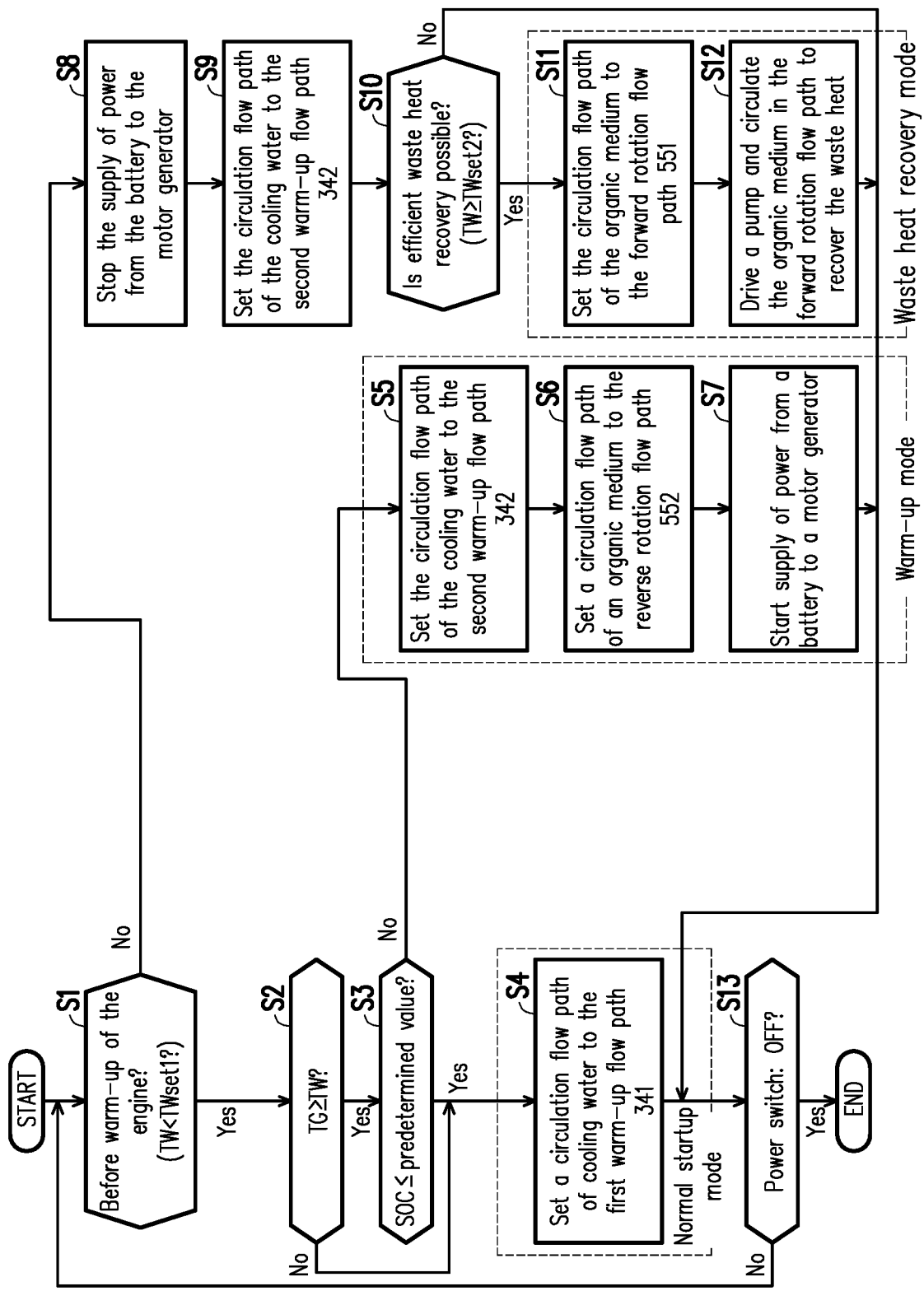
FIG. 3 is a flowchart illustrating a control procedure of the heat cycle system according to the above embodiment.

FIG. 3 is a flowchart illustrating a specific control procedure of the heat cycle system 1. The flowchart of FIG. 3 is executed in the control device 7 in response to, for example, a driver's operation of a power switch for starting the vehicle.

In S1, a control device determines whether or not it is before warm-up of an engine, i.e., determines whether or not warm-up of the engine is necessary. More specifically, the control device determines whether or not a cooling water outlet temperature TW acquired via a cooling water temperature sensor is lower than a valve closing temperature TWset1 of a thermostat (TW<TWset1). If the determination in S1 is YES, the control device determines that warm-up of the engine is necessary, and the process moves to S2.

In S2, the control device determines whether or not efficient engine warm-up is possible by performing heat exchange between a Rankine cycle circuit and a cooling circuit. More specifically, the control device determines whether or not a post-compression temperature TG acquired via an organic medium temperature sensor is equal to or higher than the cooling water outlet temperature TW (TG≥TW). If the determination in S2 is YES, the control device determines that efficient warm-up can be executed, and the process moves to S3. If the determination in S2 is NO, the control device determines that efficient warm-up cannot be executed, and the process moves to S4.

In S3, the control device determines whether or not SOC of a battery is equal to or less than a predetermined value. If the determination in S3 is YES, the control device determines that the warm-up mode using power of the battery cannot be executed, and the process moves to S4. On the other hand, if the determination in S3 is NO, the control device determines that the warm-up mode can be executed, and the process moves to S5.

In S4, since the control device sets a circulation flow path of cooling water to the first warm-up flow path 341 by a three-way valve, the engine is warmed up under the normal startup mode, and the process moves to S13.

In S5, the control device sets the circulation flow path of the cooling water to the second warm-up flow path 342 by the three-way valve, and the process moves to S6. In S6, by opening an electronic expansion valve and turning off a pump, the control device sets a circulation flow path of an organic medium to the reverse rotation flow path 552, and the process moves to S7. In S7, since the control device supplies power from the battery to a motor generator and causes the expander to operate as a compressor, the engine is warmed up under the warm-up mode, and the process moves to S13. Moreover, under the warm-up mode, the control device adjusts an opening degree of the electronic expansion valve according to an outside air temperature acquired via an outside air temperature sensor, so as to sufficiently recover thermal energy of the outside air by heat exchange between the outside air and the organic medium in the condenser.

Returning to S1, if the determination of S1 is NO, the control device determines that warm-up of the engine is unnecessary, i.e., that the engine is in the state after warm-up, and the process moves to S8. In S8, in the case where the warm-up of the engine has been performed under the warm-up mode until just before, the control device stops the supply of power from the battery to the motor generator, and the process moves to S9.

In S9, in the case where the warm-up of the engine has been performed under the normal startup mode until just before, the control device sets the circulation flow path of the cooling water to the second warm-up flow path 342 by the three-way valve, and the process moves to S10.

In S10, the control device determines whether or not efficient engine waste heat recovery can be realized in the Rankine cycle circuit. More specifically, the control device determines whether or not the cooling water outlet temperature TW is equal to or higher than a valve opening temperature TWset2 of the thermostat (TW≥TWset2).

If the determination in S10 is YES, the control device determines that efficient engine waste heat recovery can be realized, and the process moves to S11. In S11, by fully closing the electronic expansion valve, turning on the pump, and further rotating the expander forward, the control device sets the circulation flow path of the organic medium to the forward rotation flow path 551, and the process moves to S12. In S12, by driving the pump and circulating the organic medium in the forward rotation flow path 551, the control device recovers the waste heat of the engine under the waste heat recovery mode, and the process moves to S13. Moreover, under the waste heat recovery mode, the control device controls a rotational speed of the pump by feedback control using a detection signal of a liquid amount sensor (not illustrated) detecting a liquid amount in the evaporator, so that a liquid amount of the organic medium in the evaporator can be maintained at a predetermined target amount.

On the other hand, if the determination in S10 is NO, the control device determines that efficient engine waste heat recovery cannot be realized, and the process moves to S13. In S13, whether or not a power switch for stopping the vehicle has been operated by the driver is determined. If the determination in S13 is NO, the process returns to S1. On the other hand, if the determination in S13 is YES, the processing in FIG. 3 is ended.

According to the heat cycle system 1 of the present embodiment, the following effects are achieved.

(1) The heat cycle system 1 includes the cooling circuit 3 in which the cooling water performing heat exchange with the engine 2 and the exhaust of the engine 2 circulates, and the Rankine cycle circuit 5 including the evaporator 52, the expander 53 and the condenser 54 through which the organic medium having a lower boiling point than the cooling water circulates. After the engine warm-up, the control device 7 operates the Rankine cycle circuit 5 in the waste heat recovery mode in which the organic medium is circulated through the evaporator 52, the expander 53, and the condenser 54 in this order. In the waste heat recovery mode, the organic medium is heated by the cooling water heated by the warmed-up engine 2 and the exhaust of the engine 2 in the evaporator 52, energy is recovered in the process of depressurizing the organic medium in the expander 53, and the organic medium is then cooled by heat exchange with the outside air in the condenser 54. Accordingly, after the warm-up of the engine 2, the waste heat of the engine 2 can be recovered as energy. Here, in the heat cycle system 1, during the waste heat recovery, thermal energy of the exhaust of the engine 2 is transferred to the organic medium in the evaporator 52 via the cooling water circulating through the cooling circuit 3. That is, unlike the disclosure of Patent Document 1, the organic medium does not directly exchange heat with the exhaust of the engine 2. For this reason, in the heat cycle system 1, since heat resistance required for the Rankine cycle circuit 5 can be equal to or lower than the temperature of the cooling water, which is lower than the temperature of the exhaust, a light material can be used accordingly. In addition, since thermal decomposition of the organic medium due to heat of the exhaust can be suppressed, controllability can also be improved.

In addition, before the warm-up of the engine 2, the control device 7 operates the Rankine cycle circuit 5 in the warm-up mode in which the organic medium is circulated through the condenser 54, the expander 53, and the evaporator 52 in this order. In the warm-up mode, the organic medium is compressed in the expander 53, cooled by heat exchange with the cooling water circulating through the cooling circuit 3 in the evaporator 52, and then heated by heat exchange with the outside air in the condenser 54. On the other hand, in the cooling circuit 3, the cooling water is heated by performing heat exchange with the exhaust. Therefore, in the warm-up mode in the heat cycle system 1, the engine 2 can be warmed up using the thermal energy obtained from the engine exhaust, the thermal energy obtained by compressing the organic medium by the expander 53, and the thermal energy obtained by heating the organic medium with the outside air in the condenser 54. Particularly, compared to the disclosure of Patent Document 1, in the heat cycle system 1, since the cooling water can be heated with the thermal energy obtained by heating the organic medium with the outside air in the condenser 54, the engine 2 can be promptly warmed up accordingly. In addition, unlike the disclosure of Patent Document 1, in the heat cycle system 1, since the thermal energy of the exhaust is transferred to the cooling water without via the organic medium having lower specific heat than the cooling water, the engine 2 can be promptly warmed up using the thermal energy of the exhaust.

(2) In the heat cycle system 1, two flow paths, namely, the first flow path 58a provided with the pump 51, and the second flow path 58b provided with the electronic expansion valve 59 and bypassing the pump 51, are provided in the Rankine cycle circuit 5. In the warm-up mode, the electronic expansion valve 59 is opened, and the organic medium passing through the evaporator 52 is depressurized and supplied to the condenser 54. Accordingly, in the warm-up mode, the organic medium circulates through the expander 53→the evaporator 52→the electronic expansion valve 59→the condenser 54→the expander 53 in this order. Particularly, in the heat cycle system 1, by providing the electronic expansion valve 59 on the circulation flow path of the organic medium in the warm-up mode, the organic medium flowing into the condenser 54 can be depressurized so that the organic medium can be heated by heat exchange with the outside air in the condenser 54, and the cooling water can be heated using the thermal energy of the outside air, and thus the engine 2 can be promptly warmed up.

(3) In the heat cycle system 1, during execution of the warm-up mode, the opening degree of the electronic expansion valve 59 is controlled based on the outside air temperature acquired by the outside air temperature sensor 73. Accordingly, in the warm-up mode, the organic medium can be depressurized so that the organic medium can be heated with the outside air in the condenser 54, and the thermal energy for warming up the engine 2 can be obtained.

(4) In the heat cycle system 1, the battery 8 exchanging electric energy with the expander 53 is provided. In the case where the storage amount of the battery 8 is greater than the predetermined value, the warm-up mode is executed by using the electric energy of the battery 8; in the case where the storage amount of the battery 8 is smaller than the predetermined value, the warm-up mode is not executed and the normal startup mode is executed. Accordingly, the engine 2 can be warmed up in an appropriate manner corresponding to the storage amount of the battery 8. Moreover, in the heat cycle system 1, in addition to the Rankine cycle circuit 5 in which the organic medium circulates, the cooling circuit 3 in which the cooling water circulates is provided. In addition, as described above, in the cooling circuit 3, since the thermal energy of the exhaust is recovered by the cooling water having higher specific heat than the organic medium, even if the warm-up mode is not executed, the warm-up of the engine 2 will not be excessively prolonged.

Second Embodiment

Next, a second embodiment of the disclosure is explained with reference to the drawings.

Figure 4:
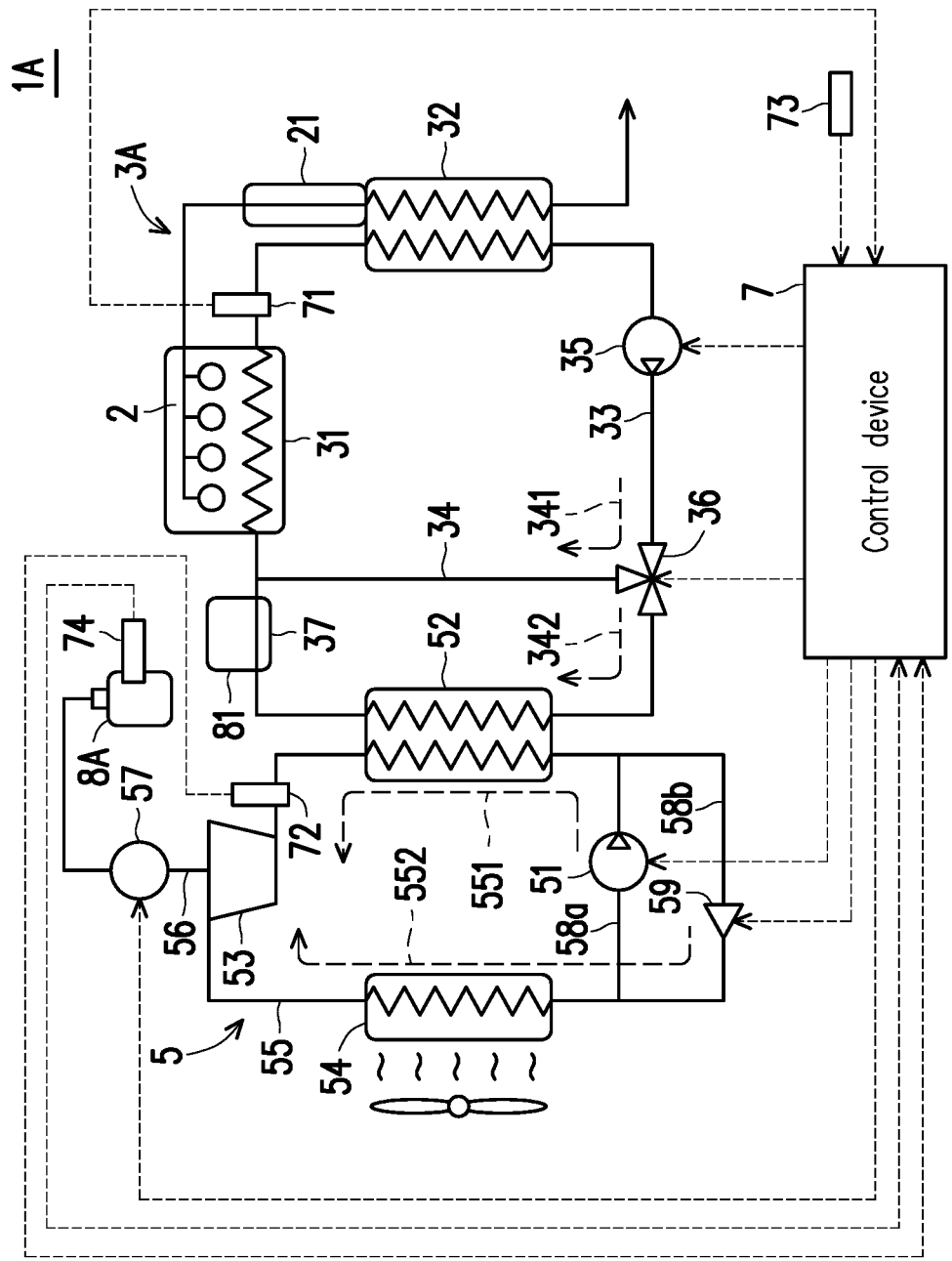
FIG. 4 illustrates a configuration of a heat cycle system according to a second embodiment of the disclosure.

FIG. 4 illustrates a configuration of a heat cycle system 1A according to the present embodiment. The heat cycle system 1A is different from the heat cycle system 1 according to the first embodiment in the configuration of a battery 8A and the configuration of a cooling circuit 3A. Moreover, in the following explanation of the heat cycle system 1A, the same reference numerals are given to the same components as those of the heat cycle system 1, and a detailed explanation thereof is omitted.

The heat cycle system 1A may be installed on a so-called hybrid vehicle equipped with the engine 2 and a traveling motor (not illustrated). On such a hybrid vehicle, the battery 8A having a higher voltage than the battery 8 of the first embodiment, and a power control unit 81 (hereinafter referred to as "PCU 81") composed of a converter or an inverter for converting power between the battery 8A and the traveling motor, are installed. Moreover, in the present embodiment, the heat cycle system 1A suitable for an air-cooled hybrid vehicle in which the battery 8A is cooled by air cooling is explained.

The cooling circuit 3A is part of the cooling water circulation flow path 33 and includes a PCU water jacket 37 provided in a PCU case accommodating the PCU 81. The PCU water jacket 37 is a cooling water flow path promoting heat exchange between the cooling water and the PCU 81. The PCU water jacket 37 is provided, for example, between the evaporator 52 and the first cooling water flow path 31 in the cooling water circulation flow path 33.

According to the heat cycle system 1A of the present embodiment, in addition to the above effects (1) to (4), the following effect is achieved.

(5) In a conventional heat cycle system, when the engine 2 is stopped and an EV travel using the traveling motor continues to be executed, since the temperature of the cooling water may gradually decrease, the engine 2 may be forcibly started in order to raise the temperature of the cooling water. In contrast, in the heat cycle system 1A, by providing the PCU water jacket 37 in the cooling circuit 3A, the cooling water can be heated with waste heat generated in the PCU 81 due to execution of the EV travel. Thus, the chance of forcibly starting the engine 2 can be reduced accordingly. In addition, in the heat cycle system 1A, by providing the PCU water jacket 37 in the cooling circuit 3A, the waste heat generated in the PCU 81, together with the waste heat generated in the engine 2, can be efficiently recovered via the cooling circuit 3A and the Rankine cycle circuit 5.

Third Embodiment

Next, a third embodiment of the disclosure is explained with reference to the drawings.

Figure 5:
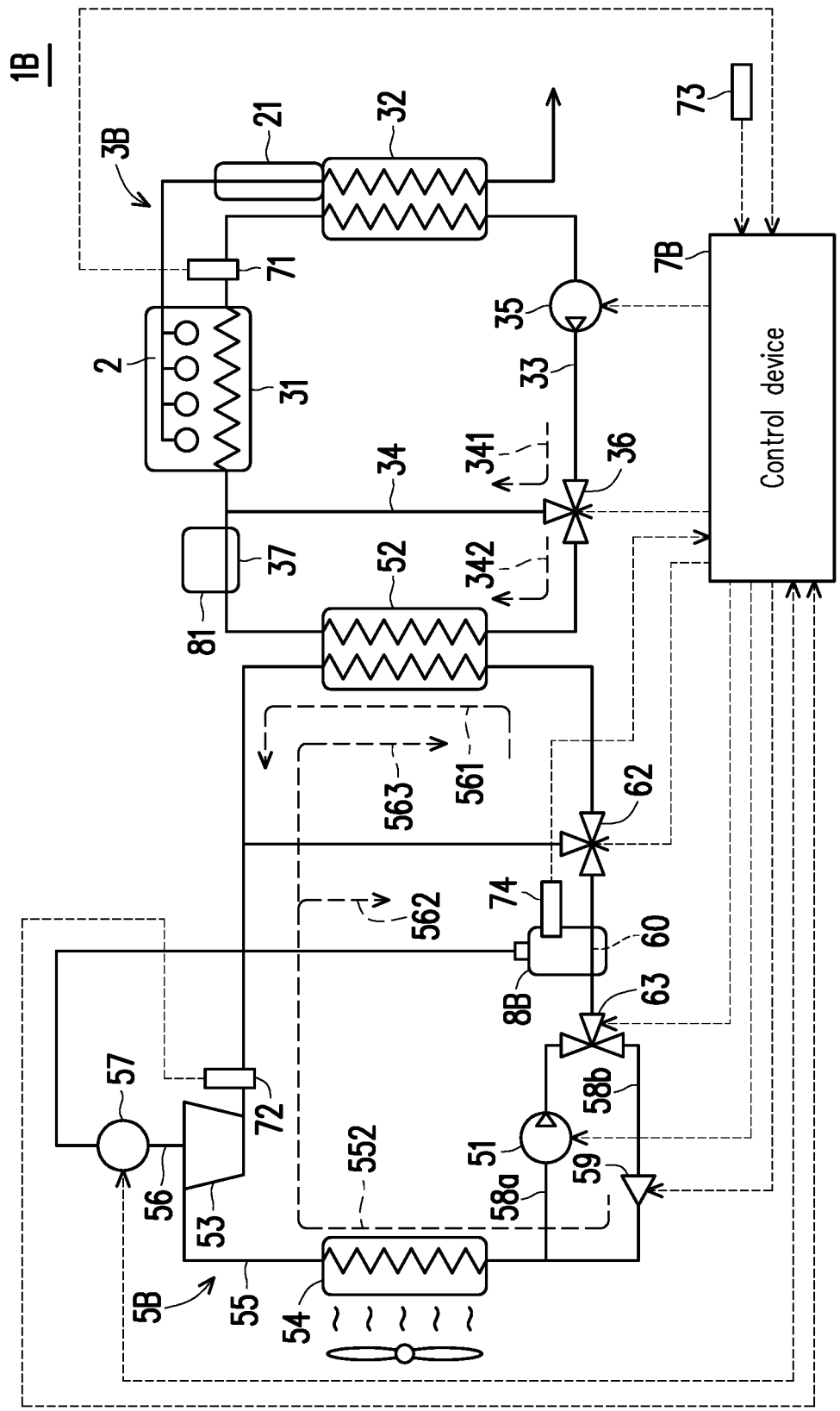
FIG. 5 illustrates a configuration of a heat cycle system according to a third embodiment of the disclosure.

FIG. 5 illustrates a configuration of a heat cycle system 1B according to the present embodiment. The heat cycle system 1B is different from the heat cycle system 1 according to the first embodiment in the configuration of a battery 8B, the configuration of a cooling circuit 3B, the configuration of a Rankine cycle circuit 5B, and the control procedure executed in a control device 7B. Moreover, in the following explanation of the heat cycle system 1B, the same reference numerals are given to the same components as those of the heat cycle system 1, and a detailed explanation thereof is omitted.

The heat cycle system 1B may be installed on a so-called hybrid vehicle equipped with the engine 2 and a traveling motor (not illustrated). In such a hybrid vehicle, the voltage battery 8B having a higher voltage than the battery 8 of the first embodiment, and the PCU 81 composed of a converter or an inverter for converting power between the battery 8B and the traveling motor, are installed. Moreover, in the present embodiment, the heat cycle system 1B suitable for a water-cooled hybrid vehicle in which the battery 8B is cooled by using an organic medium of the Rankine cycle circuit 5B is explained.

The cooling circuit 3B is part of the cooling water circulation flow path 33 and includes the PCU water jacket 37 provided in the PCU case accommodating the PCU 81. The PCU water jacket 37 is a cooling water flow path promoting heat exchange between the cooling water and the PCU 81. The PCU water jacket 37 is provided, for example, between the evaporator 52 and the first cooling water flow path 31 in the cooling water circulation flow path 33.

The Rankine cycle circuit 5B further includes, in addition to the pump 51, the evaporator 52, the expander 53, the condenser 54, the organic medium circulation flow path 55, the first flow path 58a, the second flow path 58b and the electronic expansion valve 59 explained in the first embodiment, a battery water jacket 60, an evaporator bypass flow path 61, a first three-way valve 62, and a second three-way valve 63.

The battery water jacket 60 is part of the organic medium circulation flow path 55 and is provided in a battery case accommodating the battery 8B. The battery water jacket 60 is an organic medium flow path promoting heat exchange between the organic medium and the battery 8B. For example, as shown in FIG. 1, the battery water jacket 60 is provided between the evaporator 52 and the electronic expansion valve 59 in the organic medium circulation flow path 55.

The evaporator bypass flow path 61 communicates between the expander 53 and the evaporator 52 and between the evaporator 52 and the battery water jacket 60 in the organic medium circulation flow path 55, and bypasses the evaporator 52. The first three-way valve 62 operates in accordance with a control signal from the control device 7B, and switches the circulation flow path of the organic medium between a flow path including the evaporator bypass flow path 61 and excluding the evaporator 52 and a flow path including the evaporator 52 and excluding the evaporator bypass flow path 61. The position in which the first three-way valve 62 is provided may be a junction between the side of the evaporator 52 in the organic medium circulation flow path 55 and the evaporator bypass flow path 61 as illustrated in FIG. 1, or may be a junction between the side of the expander 53 in the organic medium circulation flow path 55 and the evaporator bypass flow path 61.

The second three-way valve 63 operates in accordance with the control signal from the control device 7B, and switches the circulation flow path of the organic medium between the first flow path 58a in which the organic medium flows through the pump 51 and the second flow path 58b in which the organic medium flows through the electronic expansion valve 59.

Here, when the second three-way valve 63 is set to the side of the pump 51, the electronic expansion valve 59 is fully closed, the pump 51 is turned on, the expander 53 is rotated forward, and the first three-way valve 62 is further set to the side of the evaporator 52, in the Rankine cycle circuit 5, a forward rotation flow path 561 is formed in which the organic medium passes through the pump 51, the battery water jacket 60, the evaporator 52, the expander 53, and the condenser 54, and returns again to the pump 51.

In addition, when the second three-way valve 63 is set to the side of the electronic expansion valve 59, the electronic expansion valve 59 is opened, the pump 51 is turned off, the expander 53 is rotated reversely, and the first three-way valve 62 is further set to the side of the evaporator bypass flow path 61, in the Rankine cycle circuit 5, a first reverse rotation flow path 562 is formed in which the organic medium passes through the electronic expansion valve 59, the condenser 54, the expander 53, the evaporator bypass flow path 61, and the battery water jacket 60, and returns again to the electronic expansion valve 59.

In addition, when the second three-way valve 63 is set to the side of the electronic expansion valve 59, the electronic expansion valve 59 is opened, the pump 51 is turned off, the expander 53 is rotated reversely, and the first three-way valve 62 is further set to the side of the evaporator 52, in the Rankine cycle circuit 5, a second reverse rotation flow path 563 is formed in which the organic medium passes through the electronic expansion valve 59, the condenser 54, the expander 53, the evaporator 52, and the battery water jacket 60, and returns again to the electronic expansion valve 59.

As described above, a plurality of flow paths, namely, the first warm-up flow path 341, the second warm-up flow path 342, the forward rotation flow path 561, the first reverse rotation flow path 562, and the second reverse rotation flow path 563, are formed in the cooling circuit 3B and the Rankine cycle circuit 5B. Therefore, in the heat cycle system 1B, by combining these flow paths 341, 342, 561, 562 and 563, it is possible to realize various operation modes. More specifically, in the heat cycle system 1B, four operation modes, namely, the normal startup mode, the warm-up mode, the waste heat recovery mode, and a battery heating mode, can be selectively executed.

The normal startup mode is an operation mode in which warm-up of the engine 2 is promoted while heat exchange between the Rankine cycle circuit 5B and the cooling circuit 3B is prevented. Since the execution procedure and effect of the normal startup mode are substantially the same as those of the first embodiment, a detailed explanation thereof is omitted.

The waste heat recovery mode is an operation mode in which the waste heat of the engine 2 is recovered while heat exchange between the Rankine cycle circuit 5B and the cooling circuit 3B is performed. In the waste heat recovery mode, on the side of the cooling circuit 3B, the circulation flow path of the cooling water is set to the second warm-up flow path 342; on the side of the Rankine cycle circuit 5B, the circulation flow path of the organic medium is set to the forward rotation flow path 561. Moreover, since the effect of the waste heat recovery mode is substantially the same as that of the first embodiment, a detailed explanation thereof is omitted.

The warm-up mode is an operation mode in which warm-up of the engine 2 is promoted while heat exchange between the Rankine cycle circuit 5B and the cooling circuit 3B is performed. In the warm-up mode, on the side of the cooling circuit 3B, the circulation flow path of the cooling water is set to the second warm-up flow path 342; on the side of the Rankine cycle circuit 5B, the circulation flow path of the organic medium is set to the second reverse rotation flow path 563. Moreover, since the effect of the warm-up mode is substantially the same as that of the first embodiment, a detailed explanation thereof is omitted.

The battery heating mode is an operation mode in which warm-up of the battery 8B is promoted while heat exchange between the Rankine cycle circuit 5B and the cooling circuit 3B is prevented. In the battery heating mode, the circulation flow path of the organic medium is set to the first reverse rotation flow path 562. In the battery heating mode, the battery 8B is warmed up by thermal energy obtained by performing heat exchange between the organic medium depressurized by the electronic expansion valve 59 and the outside air in the condenser 54, and thermal energy obtained by causing the expander 53 to function as a compressor with power supplied from the battery 8B and compressing the organic medium by the expander 53. Moreover, in the battery heating mode, since the organic medium compressed by the expander 53 flows into the battery water jacket 60 without via the evaporator 52, the warm-up of the battery 8B can be realized more promptly than in the warm-up mode.

Next, a specific control procedure of the heat cycle system 1B is explained with reference to FIG. 6.

Figure 6:
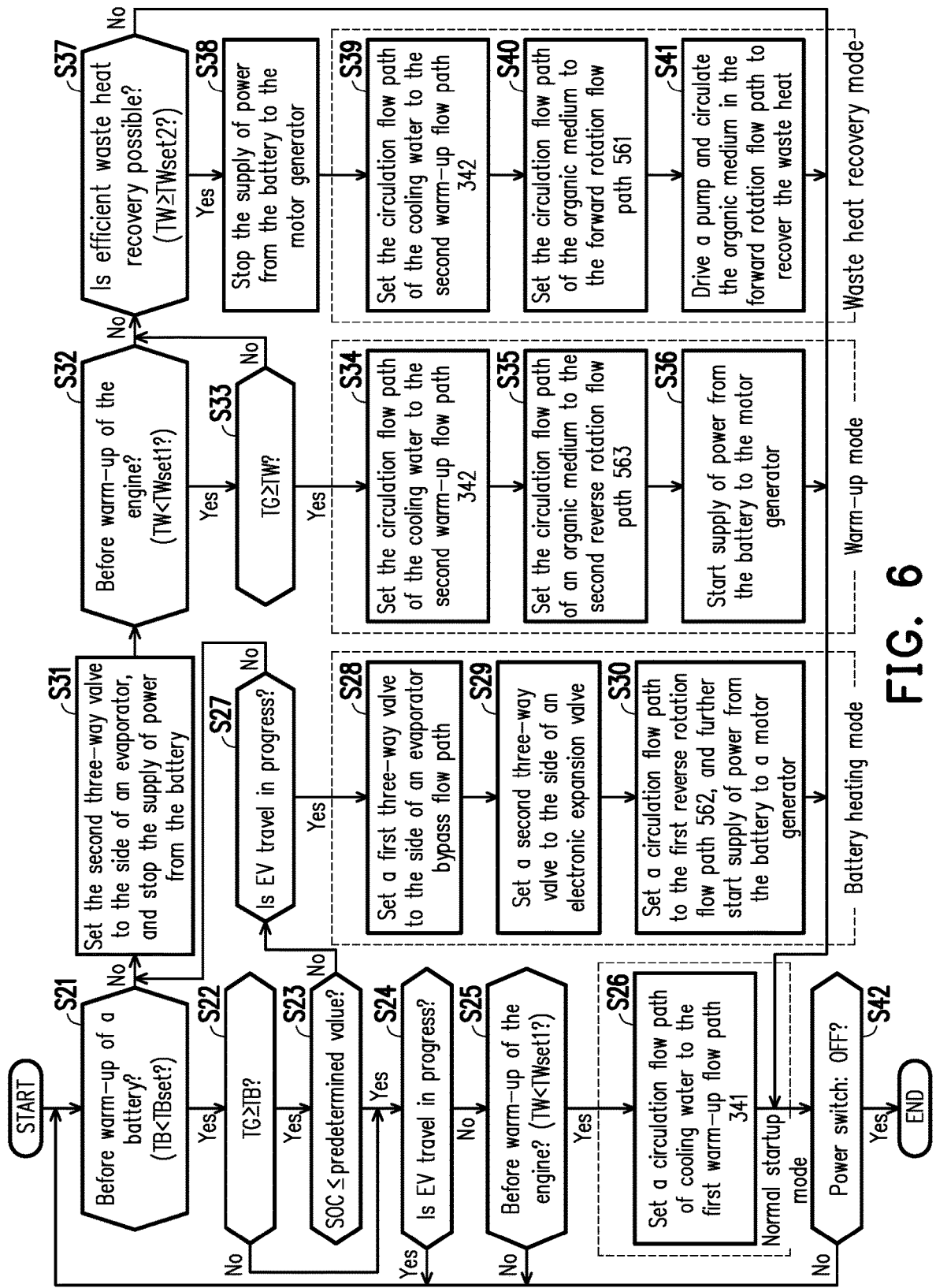
FIG. 6 is a flowchart illustrating a control procedure of the heat cycle system according to the above embodiment.

FIG. 6 is a flowchart illustrating a specific control procedure of the heat cycle system 1B. The flowchart of FIG. 6 is executed in the control device 7B as triggered by, for example, the driver's operation of the power switch for starting the vehicle.

In S21, a control device determines whether or not it is before warm-up of a battery. More specifically, the control device determines whether or not a battery temperature TB acquired via a battery sensor is lower than a predetermined value TBset (TB<TBset). The predetermined value TBset is equivalent to a lower limit of the battery temperature determined in order for the battery to exhibit its performance. If the determination in S21 is YES, the control device determines that the battery is in the state before warm-up, and the process moves to S22.

In S22, the control device determines whether or not efficient battery warm-up is possible in the above battery heating mode. More specifically, the control device determines whether or not the post-compression temperature TG acquired via the organic medium temperature sensor is equal to or higher than the battery temperature TB (TG≥TB). If the determination in S22 is YES, the control device determines that efficient warm-up can be executed, and the process moves to S23. If the determination in S22 is NO, the control device determines that efficient warm-up cannot be executed, and the process moves to S24.

In S23, the control device determines whether or not SOC of the battery is equal to or less than a predetermined value. If the determination in S23 is YES, the control device determines that warm-up mode and the battery heating mode using power of the battery cannot be executed, and the process moves to S24. On the other hand, if the determination in S23 is NO, the control device determines that the warm-up mode and the battery heating mode can be executed, and the process moves to S27.

In S24, the control device stops an engine and determines whether or not an EV travel using a traveling motor is in progress. If the determination in S24 is YES, the control device determines that the engine has not started, and the process moves to S21. On the other hand, if the determination in S24 is NO, the control device determines that the engine is starting, and the process moves to S25.

In S25, the control device determines whether or not it is before warm-up of the engine. More specifically, the control device determines whether or not the cooling water outlet temperature TW acquired via the cooling water temperature sensor is lower than the valve closing temperature TWset1 of the thermostat (TW<TWset1). If the determination in S25 is YES, the control device determines that warm-up of the engine is necessary, and the process moves to S26. If the determination in S25 is NO, the control device determines that warm-up of the engine is unnecessary, and the process moves to S21.

In S26, the control device sets the circulation flow path of the cooling water to the first warm-up flow path 341 by a three-way valve, further sets a first three-way valve to the side of an evaporator bypass flow path, and warms up the engine under the normal startup mode, and the process moves to S42.

In S27, the control device stops the engine and determines whether or not the EV travel using the traveling motor is in progress. If the determination in S27 is YES, the control device determines that it is necessary to promptly warm up the battery, and the process moves to S28. On the other hand, if the determination in S27 is NO, the control device determines that there is no need to promptly warm up the battery, and the process moves to S31.

In S28, the control device sets the first three-way valve to the side of the evaporator bypass flow path, and the process moves to S29. In S29, the control device sets a second three-way valve to the side of the electronic expansion valve, and the process moves to S30. In S30, by opening the electronic expansion valve, turning off a pump, setting the circulation flow path of the organic medium to the first reverse rotation flow path 562, and supplying power from the battery to a motor generator and causing an expander to operate as a compressor, the control device warms up the battery under the battery heating mode, and the process moves to S42. Moreover, under the battery heating mode, the control device adjusts the opening degree of the electronic expansion valve according to an outside air temperature acquired via the outside air temperature sensor, so as to sufficiently recover thermal energy of the outside air by heat exchange between the outside air and the organic medium in a condenser.

Returning to S21, if the determination in S21 is NO, the control device determines that warm-up of the battery is unnecessary, and the process moves to S31. In S31, in the case where warm-up of the battery has been performed under the battery heating mode until just before, the control device stops the supply of power from the battery to the motor generator, further sets the second three-way valve to the side of an evaporator, and the process moves to S32.

In S32, the control device determines whether or not it is before warm-up of the engine. More specifically, the control device determines whether or not the cooling water outlet temperature TW acquired via the cooling water temperature sensor is lower than the valve closing temperature TWset1 of the thermostat (TW<TWset1). If the determination in S32 is YES, the control device determines that warm-up of the engine is necessary, and the process moves to S33. If the determination in S32 is NO, the control device determines that warm-up of the engine is unnecessary, and the process moves to S37.

In S33, the control device determines whether or not efficient engine warm-up is possible by performing heat exchange between a Rankine cycle circuit and a cooling circuit. More specifically, the control device determines whether or not the post-compression temperature TG acquired via the organic medium temperature sensor is equal to or higher than the cooling water outlet temperature TW (TG≥TW). If the determination in S33 is YES, the control device determines that efficient warm-up can be executed, and the process moves to S34. If the determination in S33 is NO, the control device determines that efficient warm-up cannot be executed, and the process moves to S37.

In S34, the control device sets the circulation flow path of the cooling water to the second warm-up flow path 342 by the three-way valve, and the process moves to S35. In S35, by opening the electronic expansion valve and turning off the pump, the control device sets the circulation flow path of the organic medium to the second reverse rotation flow path 563, and the process moves to S36. In S36, since the control device supplies power from the battery to the motor generator and causes the expander to operate as a compressor, the engine is warmed up under the warm-up mode, and the process moves to S42.

As described above, according to the flowchart of FIG. 6, in the case where both the engine and the battery are in the state before warm-up, after the battery is warmed up under the battery heating mode, the engine is warmed up under the warm-up mode.

In S37, the control device determines whether or not efficient engine waste heat recovery can be realized in the Rankine cycle circuit. More specifically, the control device determines whether or not the cooling water outlet temperature TW is equal to or higher than the valve opening temperature TWset2 of the thermostat (TW≥TWset2).

If the determination in S37 is YES, the control device determines that efficient engine waste heat recovery can be realized, and the process moves to S38. In S38, in the case where warm-up has been performed under the battery heating mode or the warm-up mode until just before, the control device stops the supply of power from the battery to the motor generator, and the process moves to S39.

In S39, the control device sets the circulation flow path of the cooling water to the second warm-up flow path 342 by the three-way valve, and the process moves to S40. In S40, by fully closing the electronic expansion valve and turning on the pump, and further setting the second three-way valve to the side of the pump, the control device sets the circulation flow path of the organic medium to the forward rotation flow path 561, and the process moves to S41. In S41, by driving the pump and circulating the organic medium in the forward rotation flow path 561, the control device recovers waste heat of the engine and a PCU under the waste heat recovery mode, and the process moves to S42.

In S42, whether or not a power switch for stopping the vehicle has been operated by the driver is determined. If the determination in S42 is NO, the process returns to S21. On the other hand, if the determination in S42 is YES, the processing in FIG. 6 is ended.

According to the heat cycle system 1B of the present embodiment, in addition to the above effects (1) to (5), the following effect is achieved.

(6) In order to efficiently warm up the engine 2 in the warm-up mode, it is necessary to supply electric energy from the battery 8B to the expander 53. In addition, in a hybrid vehicle equipped with a drive motor in addition to the engine 2 as a power generation source, since a load ratio of the drive motor tends to increase before warm-up of the engine 2, it is necessary to supply electric energy from the battery 8B to the drive motor. In contrast, when the temperature of the battery 8B is low, sufficient electric energy cannot be supplied from the battery 8B to the expander 53 or the drive motor. Accordingly, in the case where both the engine 2 and the battery 8B are in the state before warm-up, the warm-up of the battery 8B may be prioritized over the warm-up of the engine 2. In contrast, in the heat cycle system 1B, the battery 8B capable of exchanging heat with the organic medium circulating through the Rankine cycle circuit 5B is provided. Furthermore, in the Rankine cycle circuit 5B, the evaporator bypass flow path 61 bypassing the evaporator 52, and the first three-way valve 62 switching the circulation flow path of the organic medium between the flow path via the evaporator 52 and the flow path via the evaporator bypass flow path 61, are provided. If before warm-up of the engine 2, since the organic medium may be cooled by the cooling water when flowing through the evaporator 52, it may accordingly take time to warm up the battery 8B. Therefore, in the heat cycle system 1B, if both the engine 2 and the battery 8B are in the state before warm-up, the first three-way valve 62 is set to the side of the evaporator bypass flow path 61, and the organic medium is circulated through the condenser 54→the expander 53→the evaporator bypass flow path 61 in this order, so that the organic medium does not pass through the evaporator 52. Accordingly, the battery 8B can be promptly warmed up. Moreover, as described above, in the heat cycle system 1B, since the cooling circuit 3 is provided in addition to the Rankine cycle circuit 5B, the warm-up of the engine 2 will not be excessively prolonged even without executing the warm-up mode. In addition, in the heat cycle system 1B, after the battery 8B is warmed up, the first three-way valve 62 is set to the side of the evaporator 52 and the warm-up mode is performed. Accordingly, the engine 2 can be promptly warmed up. According to the above, in the heat cycle system 1B, the battery 8B and the engine 2 can be warmed up in an appropriate order.

What is claimed is:
1. A heat cycle system, comprising:
a cooling circuit in which cooling water performing heat exchange with an internal combustion engine and exhaust of the internal combustion engine circulates;

a Rankine cycle circuit, comprising:
- a first heat exchanger performing heat exchange between an organic medium having a lower boiling point than the cooling water and the cooling water of the cooling circuit,
- an expander depressurizing the organic medium passing through the first heat exchanger and generating energy, and
- a second heat exchanger performing heat exchange between the organic medium and outside air;

a control device operating the Rankine cycle circuit in a warm-up mode in which the organic medium is circulated through the second heat exchanger, the expander, and the first heat exchanger in this order before warm-up of the internal combustion engine, and operating the Rankine cycle circuit in a waste heat recovery mode in which the organic medium is circulated through the first heat exchanger, the expander, and the second heat exchanger in this order after the warm-up of the internal combustion engine, wherein in the warm-up mode, by supplying the energy to the expander, the control device compresses the organic medium passing through the second heat exchanger and supplies the compressed organic medium to the first heat exchanger, and in the waste heat recovery mode, by depressurizing the organic medium passing through the first heat exchanger by the expander, the control device recovers the energy generated by the expander; and a power storage device capable of exchanging heat with the organic medium circulating through the Rankine cycle circuit, wherein the Rankine cycle circuit further comprises a bypass flow path bypassing the first heat exchanger, and a flow path switching valve switching a circulation flow path of the organic medium between a flow path via the first heat exchanger and a flow path via the bypass flow path, and before the warm-up of the internal combustion engine and the power storage device, the control device sets the flow path switching valve to the side of the bypass flow path, and after the organic medium is circulated through the second heat exchanger, the expander, and the bypass flow path in this order and the power storage device is warmed up, the control device sets the flow path switching valve to the side of the first heat exchanger and performs the warm-up mode.

2. The heat cycle system according to claim 1, wherein the Rankine cycle circuit further comprises a first flow path connecting the first heat exchanger and the second heat exchanger, a pump provided on the first flow path, a second flow path bypassing the pump and connecting the first heat exchanger and the second heat exchanger, and an expansion valve provided on the second flow path, in the warm-up mode, the control device opens the expansion valve, depressurizes the organic medium passing through the first heat exchanger, and supplies the depressurized organic medium to the second heat exchanger.

3. The heat cycle system according to claim 2, further comprising an outside air temperature acquisition unit acquiring a temperature of the outside air, wherein during execution of the warm-up mode, the control device controls an opening degree of the expansion valve based on the outside air temperature acquired by the outside air temperature acquisition unit.

4. The heat cycle system according to claim 1, wherein the power storage device exchanges electric energy with the expander, wherein in a case where a storage amount of the power storage device is greater than a predetermined value, the control device executes the warm-up mode, and in a case where the storage amount of the power storage device is smaller than the predetermined value, the control device does not execute the warm-up mode.

5. The heat cycle system according to claim 2, wherein the power storage device exchanges electric energy with the expander, wherein in a case where a storage amount of the power storage device is greater than a predetermined value, the control device executes the warm-up mode, and in a case where the storage amount of the power storage device is smaller than the predetermined value, the control device does not execute the warm-up mode.

6. The heat cycle system according to claim 3, wherein the power storage device exchanges electric energy with the expander, wherein in a case where a storage amount of the power storage device is greater than a predetermined value, the control device executes the warm-up mode, and in a case where the storage amount of the power storage device is smaller than the predetermined value, the control device does not execute the warm-up mode.

* * * * *